United States Patent [19]

Midorikawa et al.

[11] Patent Number: 5,655,088
[45] Date of Patent: Aug. 5, 1997

[54] ELECTRONIC MARKET TRANSACTION SYSTEM FOR DETECTING ORDERS REACHING A PRESCRIBED FREQUENCY OF FAILURE TO INCREASE CHANCE OF ESTABLISHING TRANSACTIONS

[75] Inventors: Hideyo Midorikawa; Hitoshi Matsubara, both of Kawasaki; Takashi Shimatani; Yasuhide Yamamoto, both of Tokyo, all of Japan

[73] Assignees: Fujitsu Limited, Kawasaki; Kokusai Denshin Denwa Co., Ltd.; Minex Corporation, both of Tokyo, all of Japan

[21] Appl. No.: 203,251

[22] Filed: Mar. 1, 1994

[30] Foreign Application Priority Data

Mar. 1, 1993 [JP] Japan .................. 5-040076

[51] Int. Cl.⁶ .................. G06F 17/60; G06F 19/00
[52] U.S. Cl. .................. 395/237
[58] Field of Search .................. 364/401, 406, 364/408; 395/201, 230, 235, 237

[56] References Cited

U.S. PATENT DOCUMENTS

| | | | |
|---|---|---|---|
| 4,674,044 | 6/1987 | Kalmus et al. | 364/408 |
| 4,903,201 | 2/1990 | Wagner | 364/408 |
| 4,926,325 | 5/1990 | Wagner | 395/237 |
| 5,038,284 | 8/1991 | Kramer | 364/408 |
| 5,046,002 | 9/1991 | Takashi et al. | 364/408 |
| 5,101,353 | 3/1992 | Lupien et al. | 364/408 |
| 5,508,913 | 4/1996 | Yamamoto | 395/237 |

FOREIGN PATENT DOCUMENTS

| | | |
|---|---|---|
| 61-080354 | 4/1986 | Japan . |
| 61-183776 | 8/1986 | Japan . |
| 3-068067 | 3/1991 | Japan . |

*Primary Examiner*—Gail O. Hayes
*Assistant Examiner*—Steven R. Yount
*Attorney, Agent, or Firm*—Staas & Halsey

[57] ABSTRACT

The present invention proves an electronic dealing system, which electronically performs matching processing between information on transaction orders placed by order side customers and information on transaction orders placed by hit side customers so as to establish transactions the electronic dealing system detects orders for which hit requests have been made, but for which transactions have failed to be established for a long period of time and eliminates those orders from the electronic dealing market. Further, when transactions fail to be established due to factors other than the transaction price and the transaction amounts, other customers which would help establish the transactions between order side and hit side customers are found so as to increase the number of transactions which are established.

20 Claims, 15 Drawing Sheets

Fig.5

| SELLING | | | BUYING | | |
|---|---|---|---|---|---|
| 144.55 | 30 | 1 | 140.70 | 20 | 1 |
| 144.60 | 70 | 3 | 140.55 | 80 | 4 |
| 144.65 | 20 | 2 | 140.50 | 30 | 1 |
| 144.70 | 10 | 1 | 140.40 | 10 | 1 |
| 144.75 | 20 | 1 | 140.20 | 10 | 1 |

PARTY
AMOUNT
PRICE

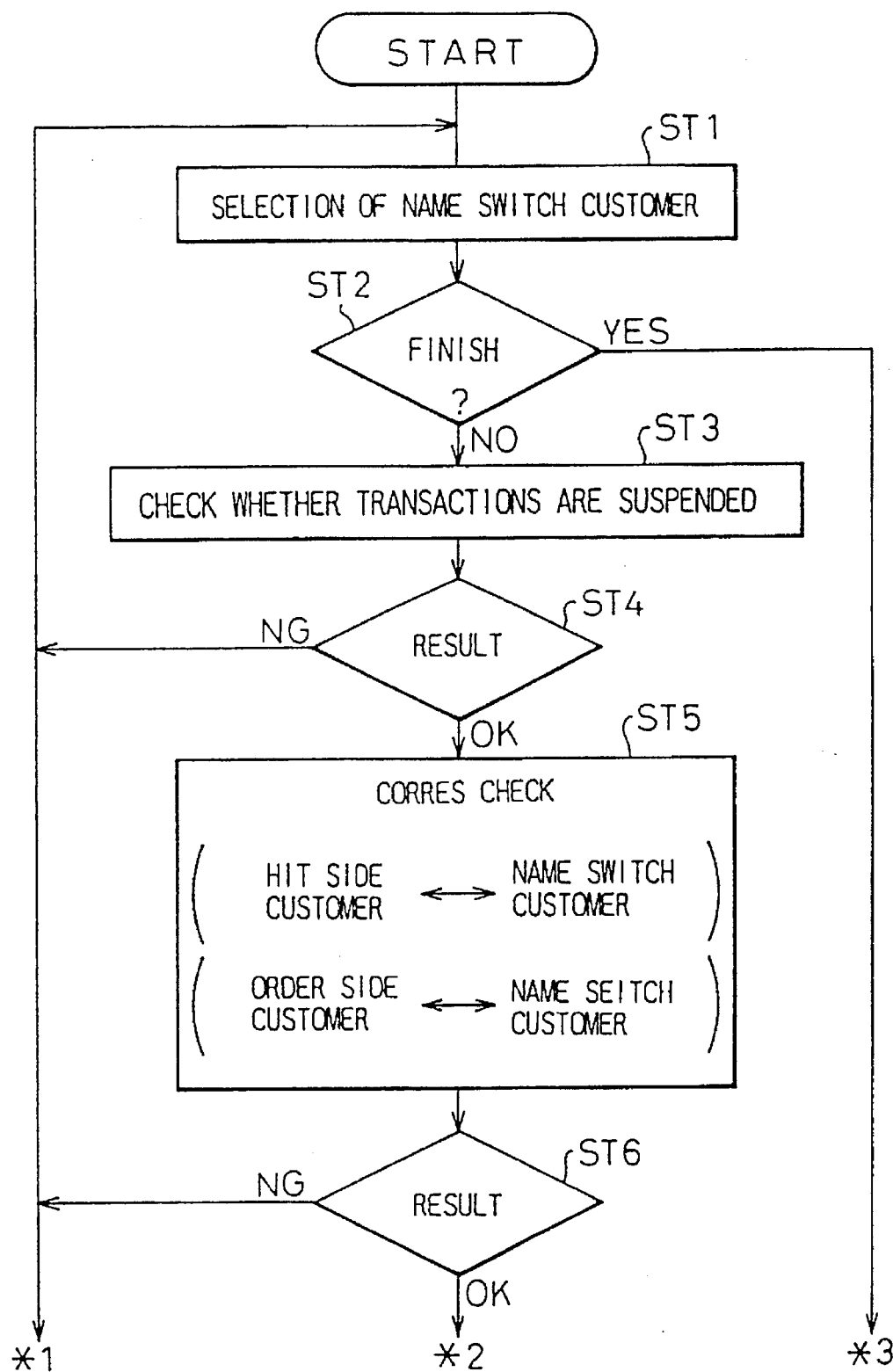

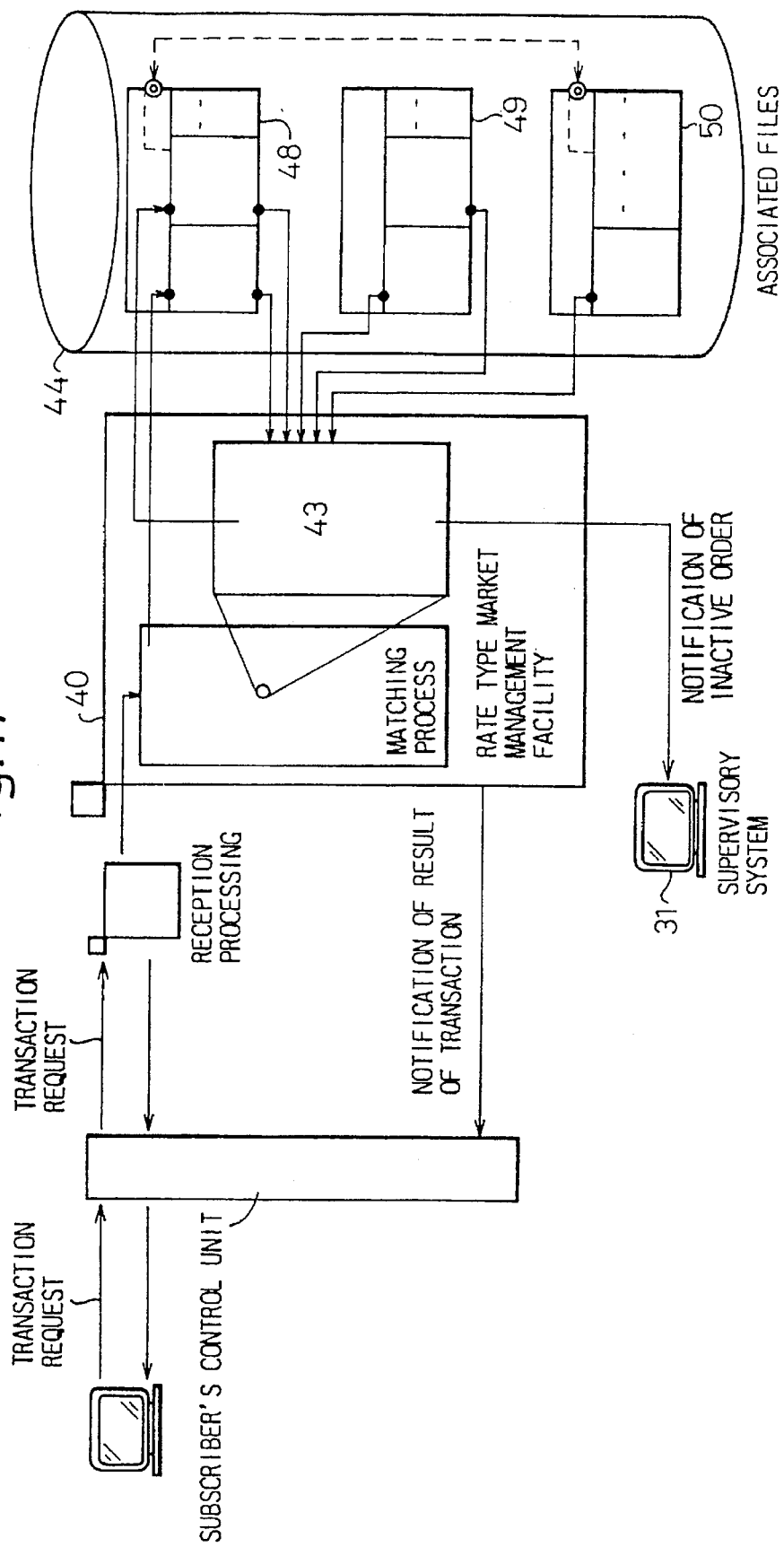

ated between the order side customer and the hit side customer, the method comprising the steps of:

ELECTRONIC MARKET TRANSACTION SYSTEM FOR DETECTING ORDERS REACHING A PRESCRIBED FREQUENCY OF FAILURE TO INCREASE CHANCE OF ESTABLISHING TRANSACTIONS

BACKGROUND OF THE INVENTION

1. Field of the Invention

The present invention relates to an electronic dealing system which electronically performs matching processing of information on transaction orders placed by order side customers and information on transaction orders placed by hit side customers so as to establish transactions. The present invention relates to an electronic dealing system which increases the probability of establishment of transactions.

In electronic dealing systems which handle foreign exchange etc., matching processing is performed electronically between information on transaction orders placed by the order side customers and information on transaction orders placed by the hit side customers so as to establish transactions. To make such an electronic dealing system practical, it is necessary to construct it so as to increase the probability of establishment of transactions.

2. Description of the Related Art

As explained in detail later, in a conventional electronic dealing system, no positive means is provided for increasing the probability of establishment of transactions, so while an order for a transaction might remain on the electronic market as is for a long period of time, it would be left standing there. Further, no means has been provided for finding other methods for establishing transactions when transactions have failed to be established.

Due to this, conventional electronic dealing systems suffered from the problem of a low probability of establishment of transactions.

SUMMARY OF THE INVENTION

The present invention was made in consideration of the above circumstances and has as its object the provision of a new electronic dealing system which increases the probability of establishment of transactions.

To attain the above object, the present invention is constituted to detect orders for which hit requests have been made, but for which transactions have failed to be established for a long period of time and to eliminate those orders from the electronic dealing market. Further, when transactions fail to be established due to factors other than the transaction price and the transaction amounts, other customers which would help establish the transactions between order side and hit side customers are found so as to increase the number of transactions which are established.

BRIEF DESCRIPTION OF THE DRAWINGS

The above object and features of the present invention will be more apparent from the following description of the preferred embodiments with reference to the accompanying drawings, wherein:

FIG. 5 is a view showing an example of the display of market information, FIGS. 14A and 14B are flow charts showing an embodiment of processing executed in a name switch process, FIG. 17 is a view for explaining the processing in an inactive order check process.

DESCRIPTION OF THE PREFERRED EMBODIMENTS

Before describing the embodiments of the present invention, the related art and the problems therein will be first described with reference to the related figures.

Figure 1:
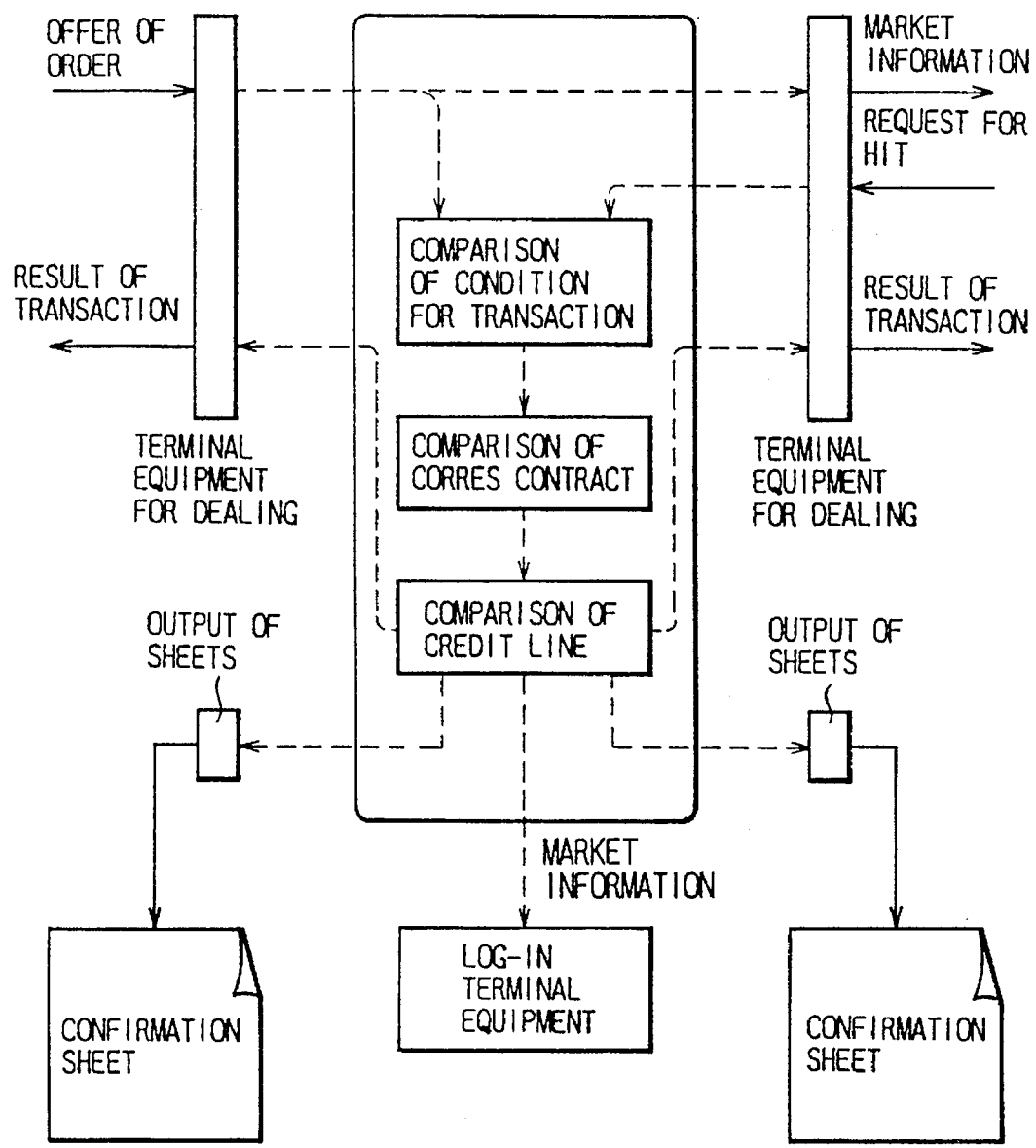
FIG. 1 is a view of the overall constitution of an electronic dealing system to which the present invention is applied.

In an electronic dealing system to which the present invention is applied, as shown in FIG. 1, when an order side customer places a transaction order through a dealing terminal, the market information (rate information) is notified to hit side customers through the dealing terminal. When in response to the notification, there is a request for a hit of the transaction order from a hit side customer, first electronic matching processing is executed so as to compare the terms of the transaction of the placed order and the terms of the transaction of the hit request.

When it is judged by this comparison that the terms of transaction (price of transaction and amount of transaction) match, the correspondent agreements are compared. That is, it is checked if each other party concluding the agreement is able to do business. If it is judged by this comparison that each other party is able to do business, the credit lines are then compared. That is, it is checked if the amount of the transaction is inside the credit lines.

If it is judged as a result of this comparison that the amount is inside the credit lines, the transaction is established, so confirmation sheets of the transaction are output to the order side customer and the hit side customer and changed market information is displayed on the log-in terminal.

In a conventional electronic dealing system performing this processing, no positive means has been provided for increasing the probability of establishment of transactions.

Therefore, as mentioned earlier, there was the problem that the probability of transactions being established was low. The present invention eliminates this problem.

Figure 2:
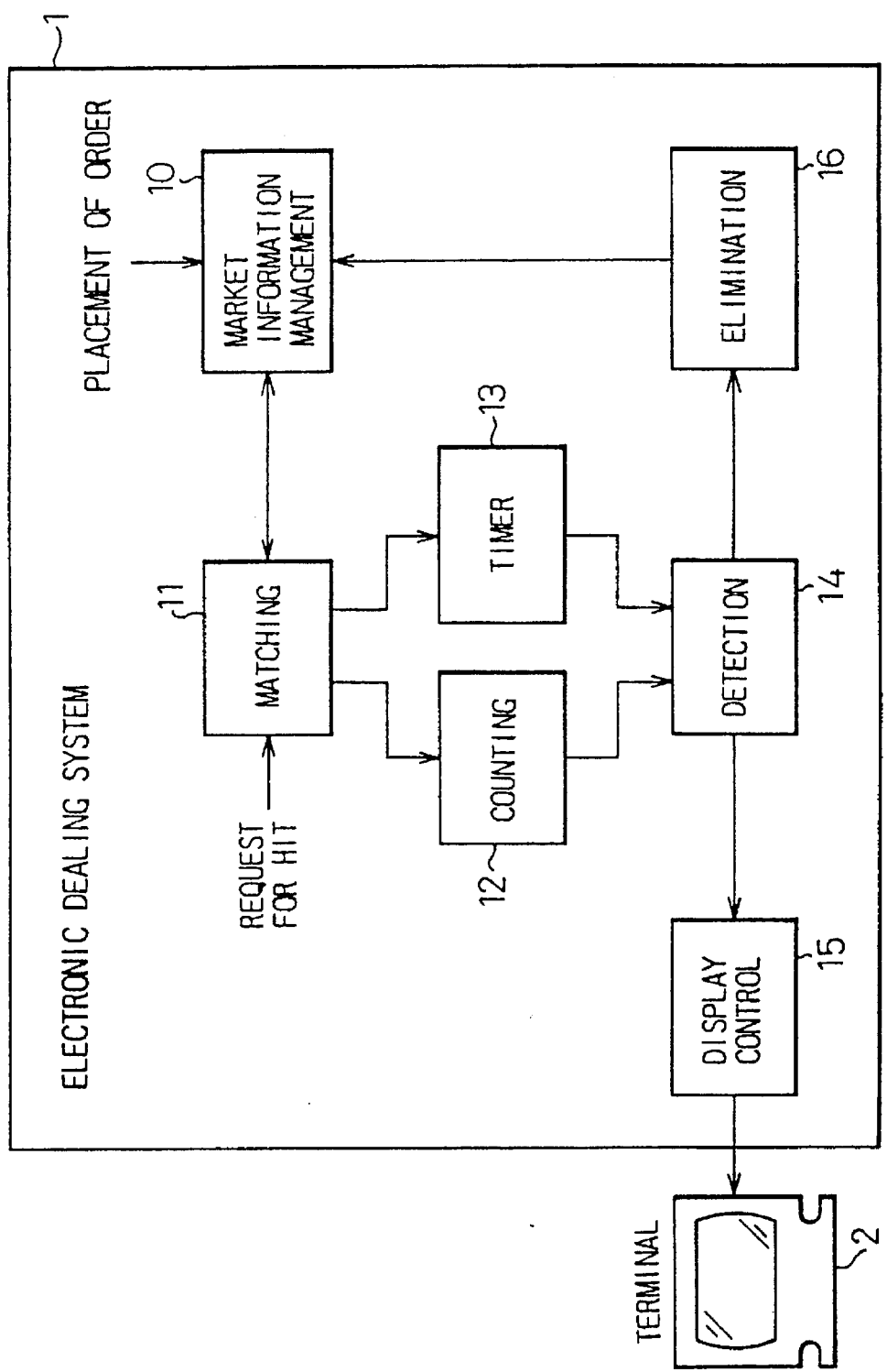
FIG. 2 is a view of a first example of a system construction of the present invention.
Figure 3:
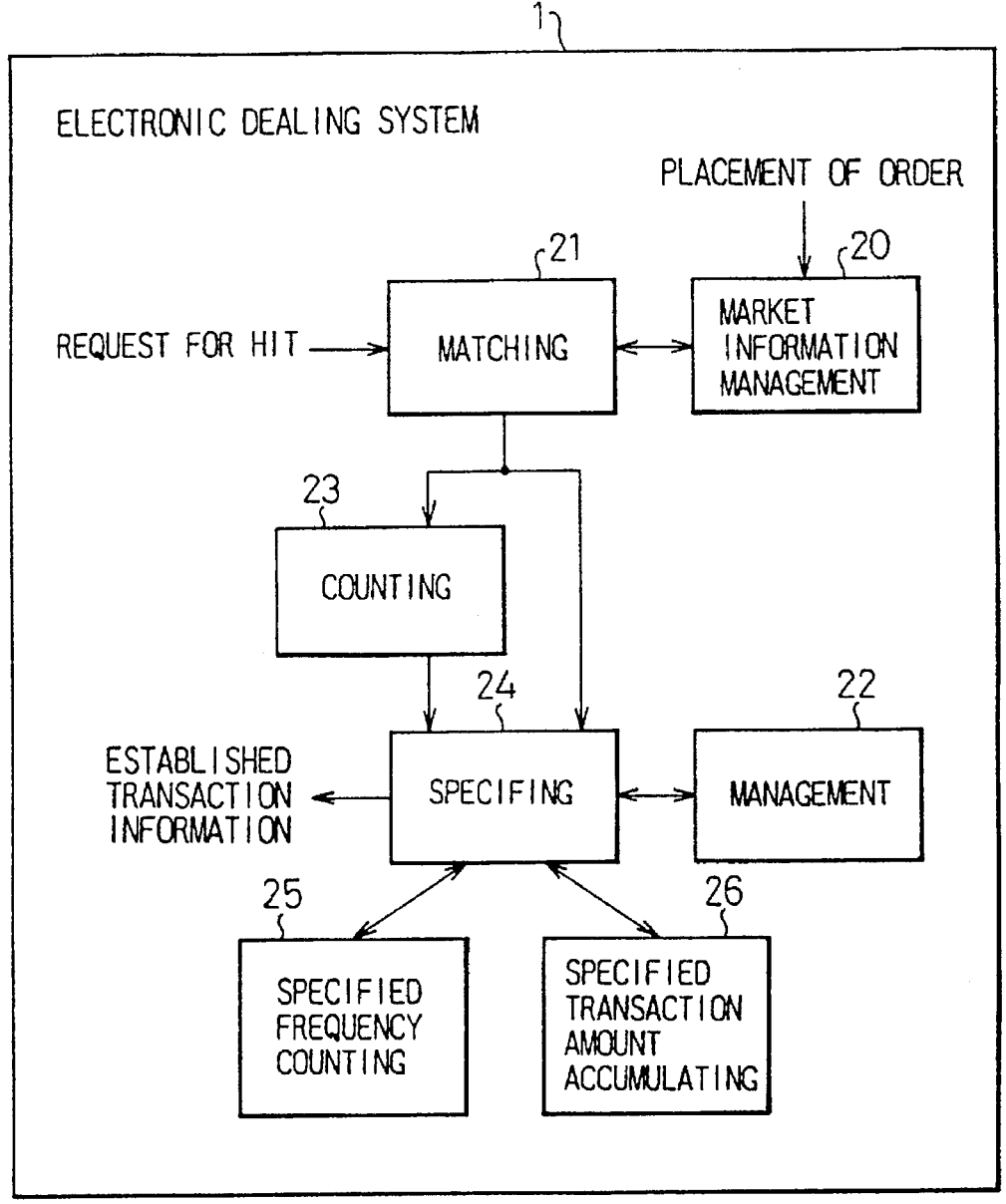
FIG. 3 is a view of a second example of a system construction of the present invention.

FIG. 2 and FIG. 3 show a first and second example of the system constructions of the present invention.

In FIG. 2, 1 is an electronic dealing system to which the present invention applies. It is designed to perform matching processing between the information on transaction orders placed by order side customers and information on transaction orders placed by hit side customers so as to establish transactions between the two parties. Reference numeral 2 is a terminal provided in the electronic dealing system 1 and executes interaction processing with customers.

The electronic dealing system of the present invention shown in FIG. 2 (first system construction) is provided with a market information management means 10 for managing orders placed by order side customers, a matching means 11 for executing matching processing between an order placed by an order side customer and a request for hit placed by a hit side customer, a counting means 12 for counting the frequency of failure of establishment of transactions for each order, a timer means 13 for timing the duration of an unchanged state during which transactions fail to be established for each order, a detecting means 14 for detecting inactive orders for which transactions have failed to be established, a display control means 15 for executing processing for displaying inactive orders, and an elimination means 16 for executing processing for eliminating inactive orders.

On the other hand, the second system construction of the electronic dealing system of the present invention shown in FIG. 3 is provided with a matching means 21 for executing matching processing between orders placed by order side customers and hit requests placed by hit side customers, a management means 22 for managing the information on transactions of one or more customers determined as the name switch customer, a counting means 23 for counting the frequency of failure of establishment where transactions are not established due to factors other than the transaction price and transaction amount, a specifying means 24 for specifying the name switch customer for enabling the transaction to be realized by intervention between the order side customer and hit side customer and specifying the amount of the transaction between the order side customer and the hit side customer made possible by the intervention of the name switch customer, a specified frequency counting means 25 for counting the specified frequency for each name switch customer specified by the specifying means 24 during a prescribed period, and a specified transaction amount accumulating means 26 for accumulating the amounts of transactions for each name switch customer specified by the specifying means 24 during the prescribed period.

More specifically, the management means 22 manages the information on whether transactions have been suspended or not, information on correspondent agreements, and information on credit lines as the information on the transactions of the name switch customer. In accordance with the managed data of the management means 22, the specifying means 24 specifies a name switch customer which suspends transactions with neither order side customer nor hit side customer and has correspondent agreement with both customers and satisfies the limiting conditions determined by the credit lines.

At this time, the specifying means 24 determines the name switch customer based on the limiting conditions set by the credit lines. That is, it preferably specifies the name switch customer conditional on that name switch customer having a credit line able to realize the maximum matching amount of the transaction between the order side customer and hit side customer made possible by the intervention of a name switch customer. In accordance with this specifying processing, it becomes possible to establish a transaction of the maximum matching amount between an order side customer and hit side customer made possible by intervention of the name switch customer.

In the electronic dealing system 1 of the present invention shown in FIG. 2, the counting means 12 counts the frequency of failure of establishment of transactions for each order placed by an order side customer and manages the counts. The timer means 13 times the duration of the unchanged state where the order remains not established and manages the timer values.

In this way, the counting means 12 manages the count of the frequency at which a transaction fails to be established for an order placed, while the timer means 13 manages the time of the duration of the unchanged state of the placed order. Further, the detecting means 14 monitors the count and the time of the order for a transaction for example when a transaction fails to be established or periodically monitors the count and time so as to detect orders where the count has reached a prescribed frequency of failure of establishment and the time has reached a prescribed duration. In this way, the detecting means 14 operates so as to detect inactive orders.

When the detecting means 14 detects the occurrence of an inactive order, the display control means 15 displays the name of inactive order on the display screen of the terminal 2, and the elimination means 16 forcibly eliminates the inactive order from the electronic dealing market.

In this way, in the electronic dealing system 1 of the present invention shown in FIG. 2, even if there is an order for which frequent inquiries on transactions are made due to the order appearing attractive at first glance to the hit side customers, if no transaction is established due to reasons such as the low credit of the order side customer, that order is eliminated from the electronic dealing market. Therefore, the probability of establishment of transactions is raised by leaving just active orders in the electronic dealing market.

Further, in the electronic dealing system 1 of the present invention shown in FIG. 3, the counting means 23 counts the frequency of failure of establishment of transactions due to factors other than the transaction price and transaction amount and manages the count.

In this way, when counting means 23 manages the count of the frequency of failure of establishment of a transaction due to factors other than the transaction price and transaction amount, the specifying means 24 judges if the count of the counting means 23 is a value exceeding the prescribed frequency of failure of establishment when a transaction is not established due to factors other than the transaction price and transaction amount. If judging that a higher value is displayed, it successively selects information on transactions of name switch customers managed by the management means 22 and evaluates the information on the transactions selected and the information on transactions of the order side and hit side customers so as to specify a name switch customer able to help establish the transaction between these customers and so as to specify the amount of the transaction as well.

At this time, the specifying means 24 preferably ends the processing at the point of time when first succeeding in specifying a name switch customer so as to speed up transactions. Further, even when a transaction fails to be established due to factors other than the transaction price and transaction amount, when either of the order side customer or hit side customer in that transaction is a customer using an agreement (i.e., a broker), that is, when not a customer party to the agreement, the counting means 23 preferably performs processing so as not to execute the counting processing and performs processing so that the specifying means 24 is not activated.

If a specified frequency counting means 25 is provided, when the specifying means 24 specifies the name switch customer, the specified frequency counting means 25 counts the specified frequency for each name switch customer so as to count the specified frequency for each name switch customer specified by the specifying means 24 during a prescribed period. Based on the results, the specifying means 24 performs processing so as not to specify as a new name switch customer during the remaining prescribed period the name switch customer exceeding the prescribed specified frequency counted by the specified frequency counting means 25.

Further, if a specified transaction amount accumulating means 26 is provided, when the specifying means 24 specifies the amount of the transaction, the specified transaction accumulating means 26 accumulates the amounts of the transactions for each name switch customer so as to accumulate the amount of transactions for each name switch customer specified by the specifying means 24 during the prescribed period. Based on the results, the specifying means 24 performs processing so as not to specify as new name switch customers during the remaining prescribed period any name switch customers whose amounts of transactions, accumulated by the specified transaction amount accumulating means 26, no longer satisfy the prescribed terms.

In this way, in the electronic dealing system 1 of the present invention shown in FIG. 3, when a transaction fails to be established between an order side customer and a hit side customer due to factors other than the transaction price and the transaction amount, this is not immediately considered a failure of establishment. If there is a name switch customer which can intervene between the two customers, the transaction between the two customers is established through the name switch customer. In this way, it becomes possible to raise the probability of establishment of a transaction.

Below, the present invention will be explained in detail in accordance with embodiments of application to an electronic dealing system handling foreign exchange.

Figure 4:
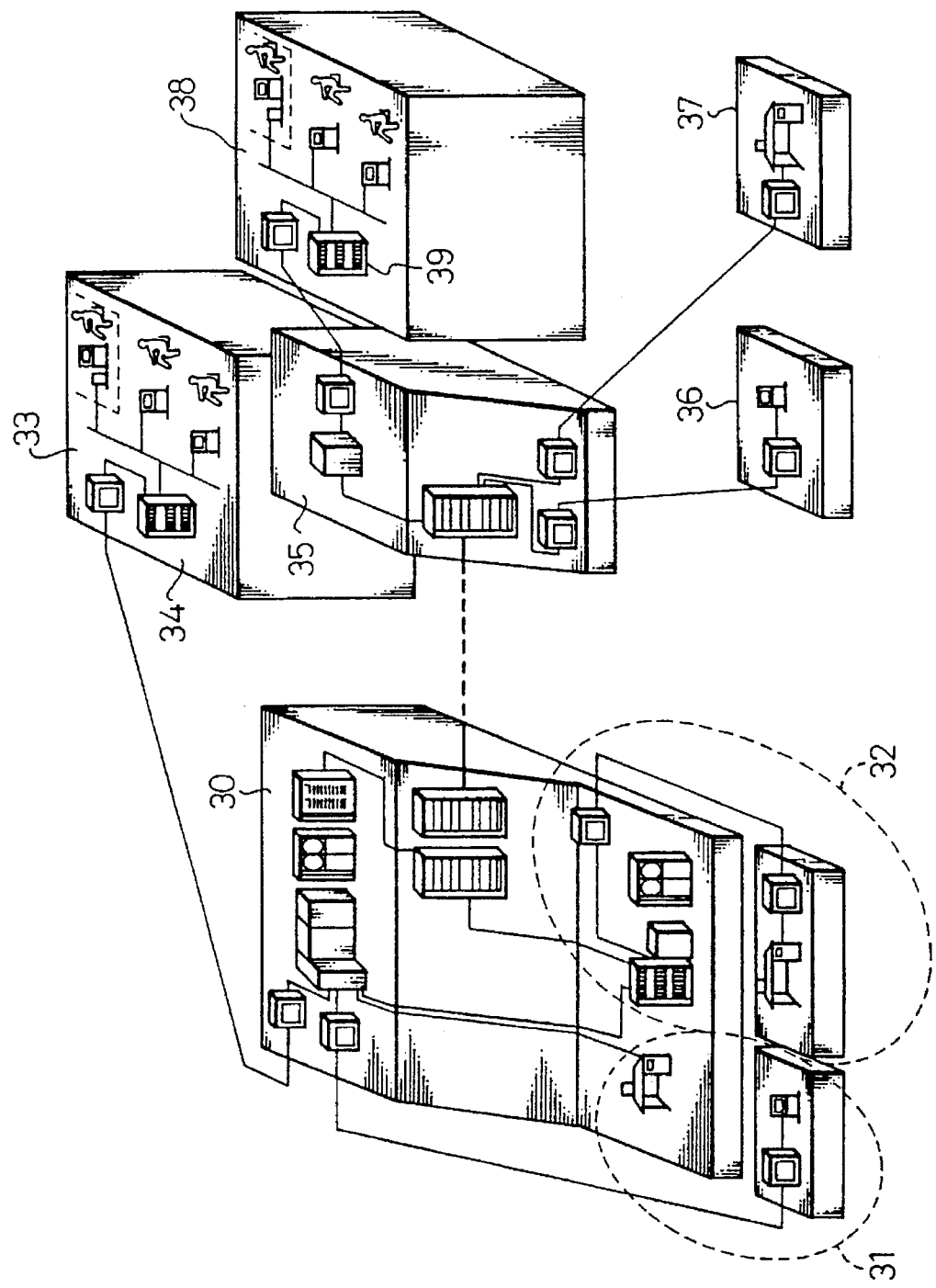
FIG. 4 is a view of the actual system construction of an electronic dealing system which mounts the present invention.

FIG. 4 is a view of the system construction of an electronic dealing system handling foreign exchange which mounts the present invention.

In FIG. 4, 30 is a host system which is constructed to manage the information on requests for transactions of foreign exchange issued from customers. It promotes the establishment of transactions for buying and selling foreign exchange by matching processing on this request information. Reference numeral 31 is a monitoring system connected to the host system 30 which monitors the operation of the host system 30. Reference numeral 32 is a charging system connected to the host system 30 which processes service fees etc. for the established transactions. Reference numeral 33 is a customer system connected to the host system 30 which executes processing for interaction with customers. Reference numeral 34 is a subscriber control apparatus which is provided in the customer system 33 and supports terminals under the customer system 33.

Reference numeral 35 is a subsystem provided overseas, for example, which supports the host system 30. Reference numeral 36 is a monitoring system connected to the subsystem 35 which monitors the state of operation of the host system etc. Reference numeral 37 is a charging system connected to the subsystem 35 which processes the service fees etc. for established transactions. Reference numeral 38 is a customer system connected to the subsystem 35 which executes processing for interaction with customers. Reference numeral 39 is a subscriber control apparatus provided in the customer system 38 which supports the terminals in the customer system 38.

The host system 30 is designed to manage the orders of information on transaction orders placed by order side customers for promoting the establishment of transactions of foreign exchange and displays on the display screens of the terminals in the customer systems (33, 38) the information on transaction requests.

FIG. 5 is a view showing an example of the display of market information presented on the display of the customers. This market information has a five-line structure comprised of five records. Here, the "price" in the figure shows the exchange rate of "US$1=140.20 yen", the "amount" shows the amount of the transaction (1 amount=US$1 million), and the "party" shows the number of customers offering that price. To facilitate transactions, the offers are arranged in the order of the best rate down.

Figure 6:
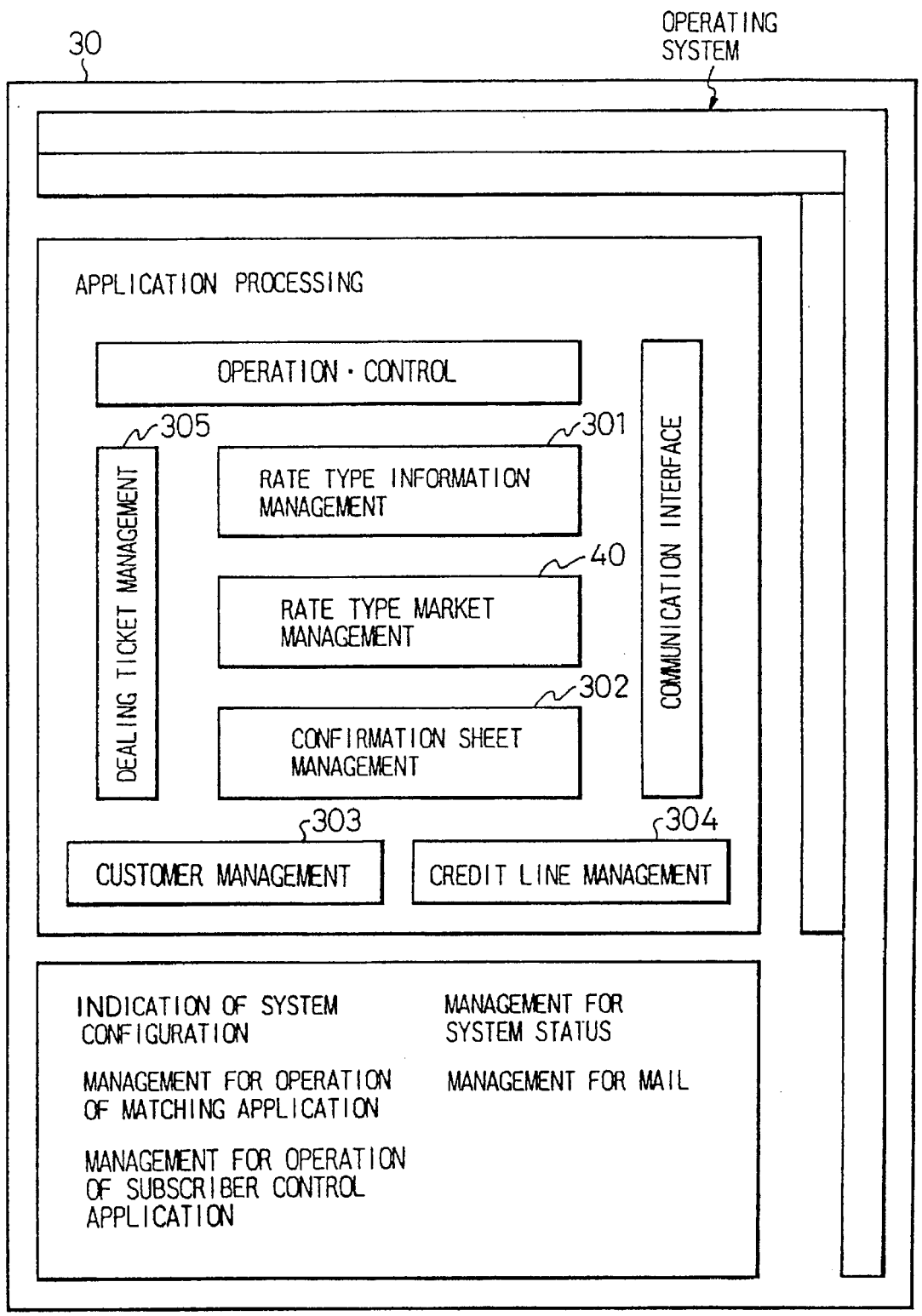
FIG. 6 is a view of the functional structure of software of a host system.

FIG. 6 is a view of the functional structure of software of a host system 30.

The rate type information management facility 301 in the figure performs processing to collect and manage orders placed by the order side customers and display them on the terminals in the customer systems 33, 38. The rate type market management facility 40 performs processing so as to promote establishment of transactions by executing matching processing between the placed orders and the hit requests. The confirmation sheet management facility 302 performs processing so as to prepare confirmation sheets of the information of the established transactions and mail them to the ordering customers and the hit request customers. The customer management facility 303 manages various types of customer information required for the matching processing, while the credit line management facility 304 manages the credit line information required for the matching processing. The dealing ticket management facility 305 issues to the charging system 32 a request for processing of the service fees for the established transaction.

Figure 7:
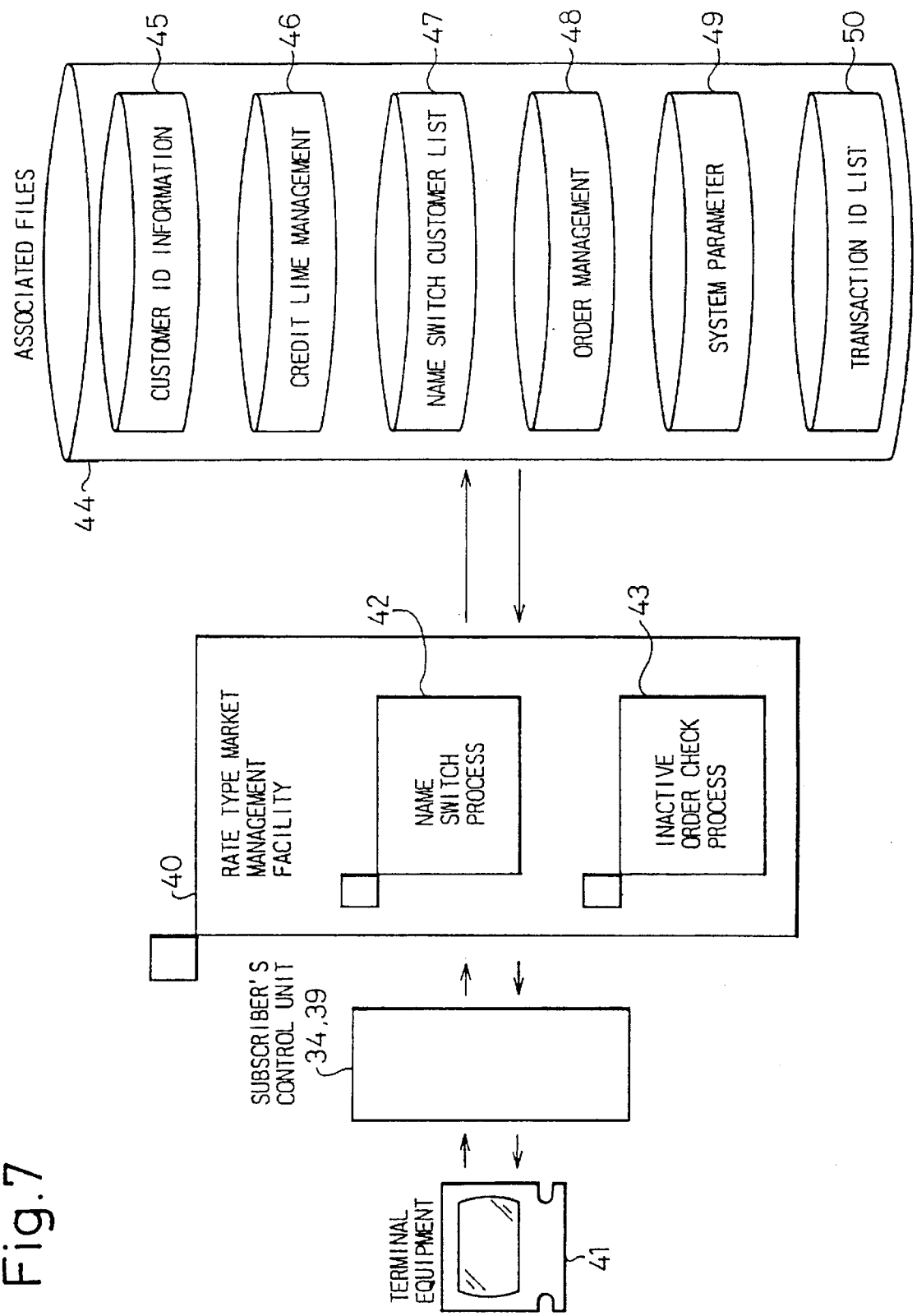
FIG. 7 is a functional block diagram showing an embodiment of the present invention.

FIG. 7 is a functional block diagram of an embodiment in the case of application of the present invention to an electronic dealing system constituted as follows:

In FIG. 7, 34 and 39 are subscriber control units shown in FIG. 4. Reference numeral 40 is a rate type market management facility shown in FIG. 6. Reference numeral 41 is a terminal under the subscriber control units 34 and 39. Reference numeral 42 is a name switch process developed in the rate type market management facility 40 for realizing the present invention. Reference numeral 43 is an inactive order check process which is developed in the rate type market management facility 40 for realizing the present invention. Reference numeral 44 is an associated file group for managing the data required for processings of the name switch process 42 and the inactive order check process 43.

The associated file group 44, for realizing the present invention, is provided, as shown in FIG. 7, with at least a customer ID information file 45, a credit line management file 46, a name switch customer list file 47, an order management file 48, a system parameter file 49, and a transaction ID list file 50.

Figure 8:
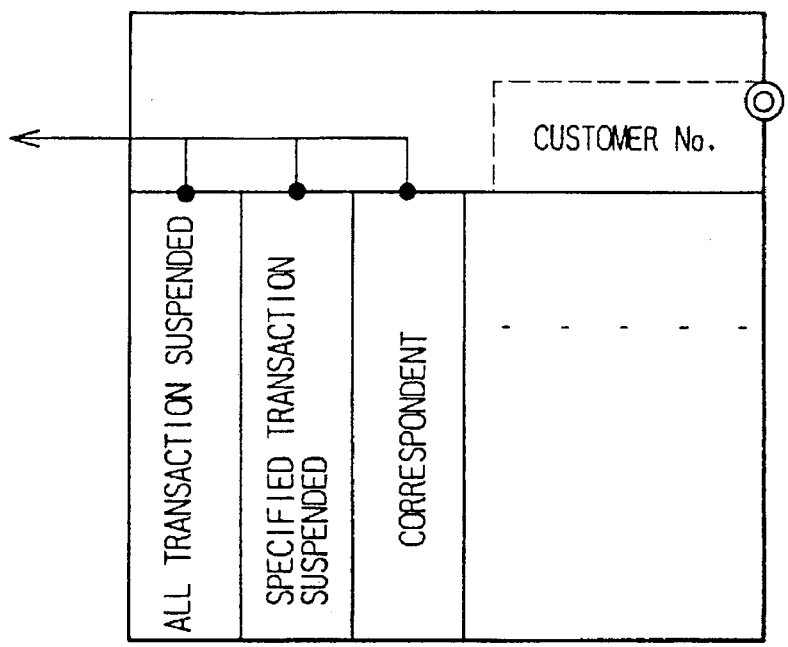
FIG. 8 is a view of the structure of file data in a customer ID information file.

The customer ID information file 45, as shown in FIG. 8, manages the customer information in correspondence to the customers. That is, it manages information on if a customer is suspended from all transactions, information on what specific customers are suspended from transactions with a customer, and information on if there is a correspondent agreement with another customer using the other customer no. as a retrieval key.

Figure 9:
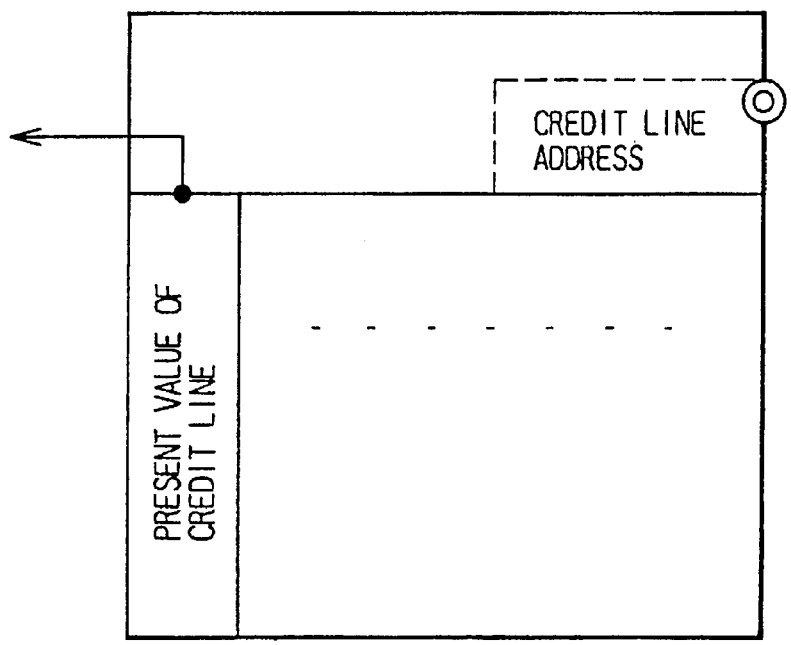
FIG. 9 is a view of the structure of file data in a credit line management file.

The credit line management file 46, as shown in FIG. 9, manages the credit lines corresponding to the customers. That is, it manages the present values of the credit lines set with other customers using the credit line addresses of the other parties as retrieval keys.

Figure 10:
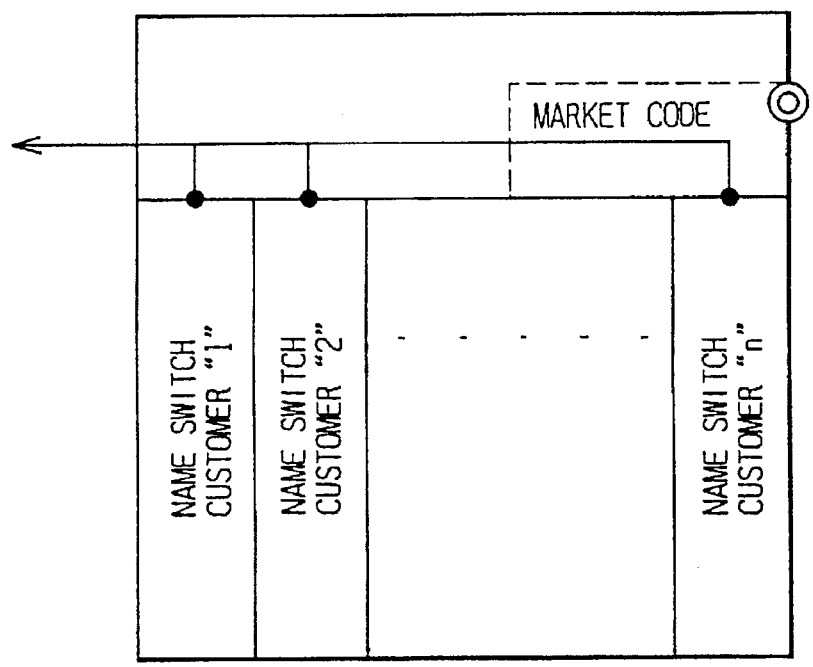
FIG. 10 is a view of the structure of file data in a name switch customer list file.

The name switch customer list file 47, as shown in FIG. 10, manages information as to who the name switch customers registered in the market are using the market code as a retrieval key.

Figure 11:
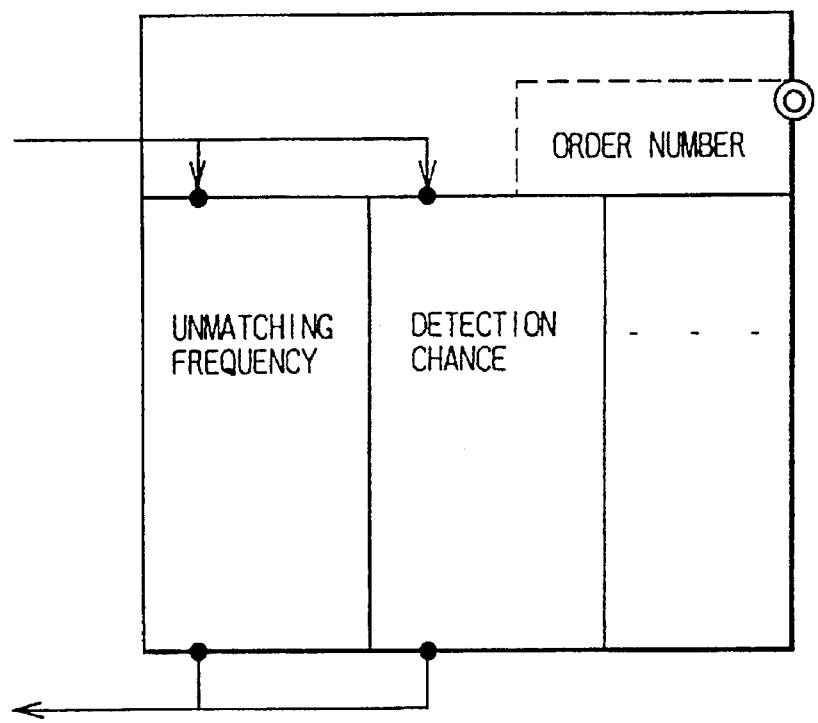
FIG. 11 is a view of the structure of file data in an order management file.

The order management file 48, as shown in FIG. 11, manages the unmatched frequency and detected chance held by the order indicated by the order no. using the order no. as the retrieval key.

Figure 12:
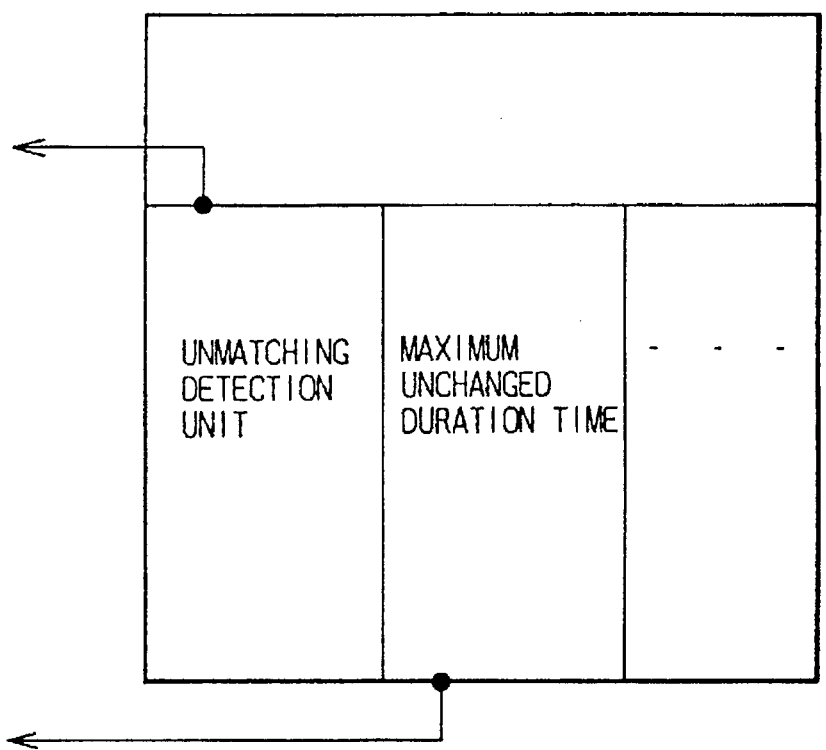
FIG. 12 is a view of the structure of file data in a system parameter file.

The system parameter file 49, as shown in FIG. 12, manages the value setting the unmatched detection unit and the value setting the maximum unchanged time.

Figure 13:
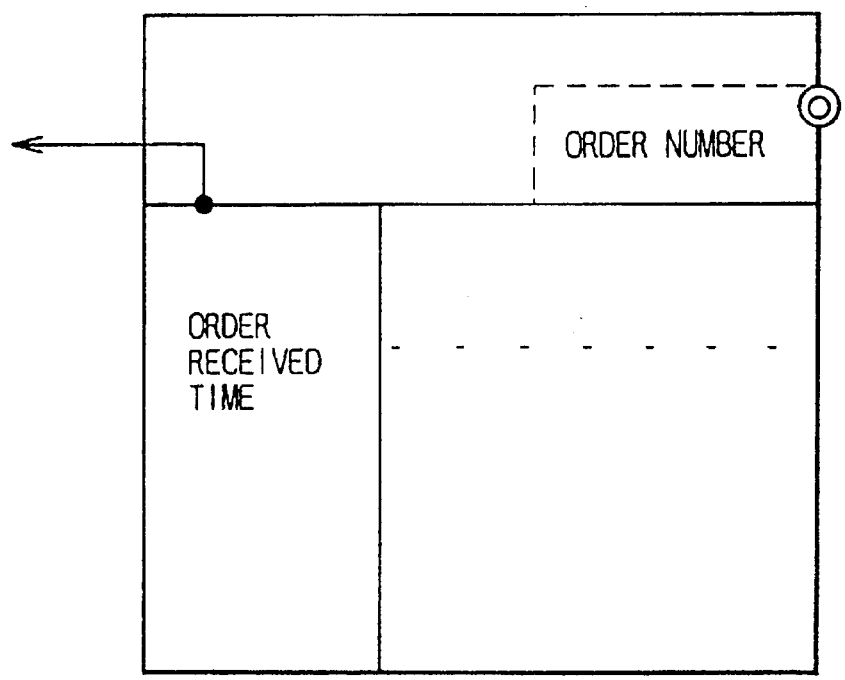
FIG. 13 is a view of the structure of file data in a transaction ID list file.

The transaction ID list file 50, as shown in FIG. 13, manages the time of receipt of an order designated by the order no. using the order no. as the retrieval key.

Next, a detailed explanation will be made of the processing of the present invention in accordance with an embodiment of the flow of processing executed by the name switch process 42 shown in FIGS. 14A and 14B and an embodiment of the flow of processing executed by the inactive order check process 43 shown in FIG. 15.

First, an explanation will be made of the conditions for activation of the name switch process 42. Here, the name switch process 42 manages the flag called the name switch probability flag in the program. Further, while not illustrated in FIG. 7, the associated file group 44 separately manages the count of the counter called the name switch activation counter.

The name switch probability flag becomes ON when a transaction for which an inquiry has been made fails to be established due to conditions other than the condition of conformity of the amount, that is, when a transaction fails to be established due to the fact that while the terms of the transaction relating to the transaction price and transaction amount are satisfied, other terms of the transaction are not satisfied and when the customer in the transaction is not a broker. On the other hand, the name switch activation counter increments by 1 the count when a transaction for which an inquiry has been made fails to be established due to conditions other than the condition of conformity of the amount and at that time the name switch probability flag is ON. Conversely, the count is cleared when the name switch process 42 is activated.

When the ON or OFF state of the name switch probability flag and the count of the name switch activation counter are input, the name switch probability flag is ON, and the count of the name switch activation counter has reached the prescribed maximum value, the name switch process 42 is activated.

Figure 14B:
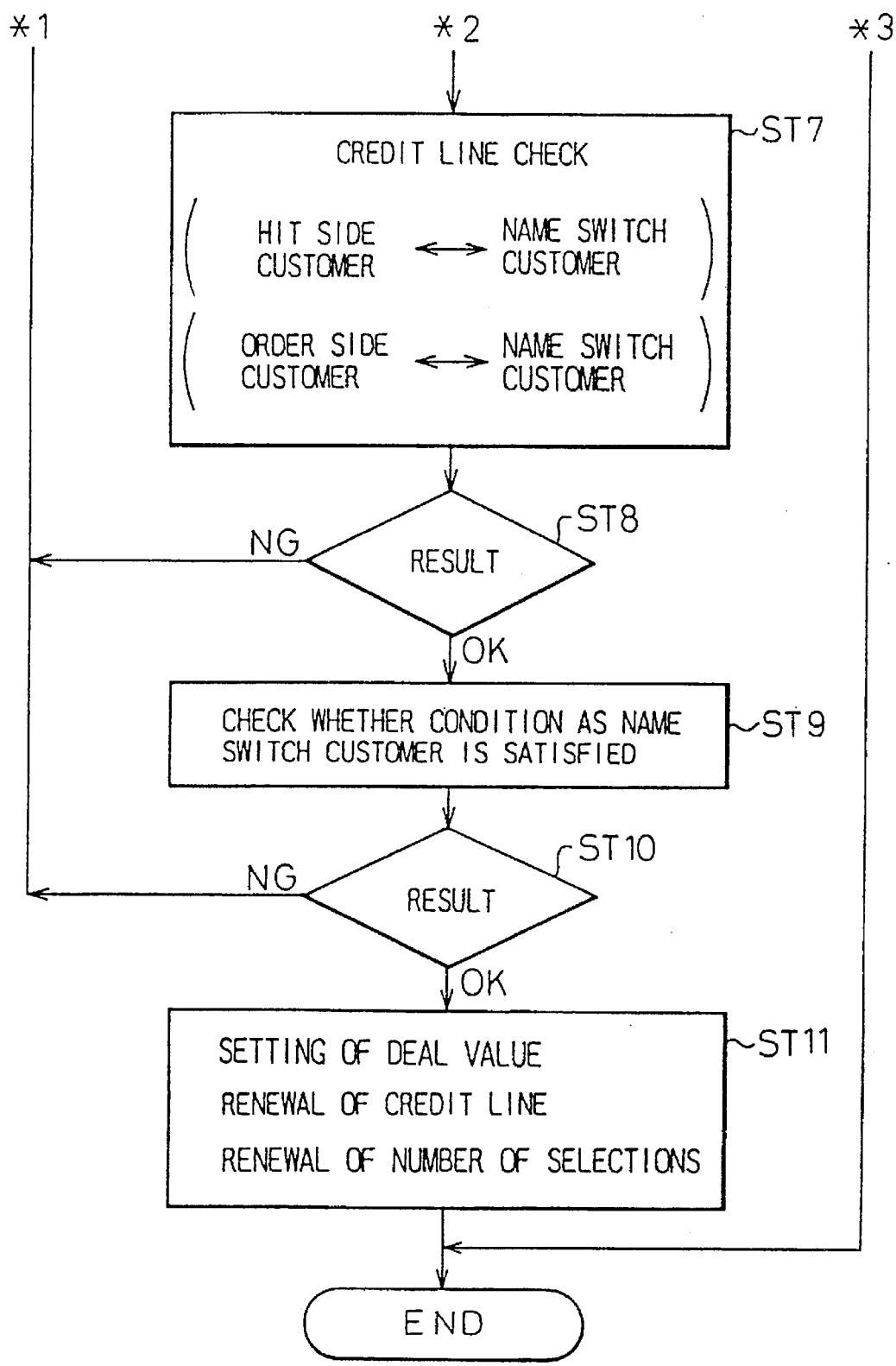

After being activated in this way, the name switch process 42, as shown in the flow of processing of FIGS. 14A and 14B, first selects at step 1 (ST1) one of the name switch customers registered in the name switch customer list file 47.

Next, at step 2 (ST2), it judges if the selection of the name switch customer could be realized. When it cannot be realized, it ends the processing.

On the other hand, at step 2, when it judges that the selection of the name switch customer could be realized, the routine proceeds to step 3 (ST3), where the managed data in the customer ID information file 45 (FIG. 7) is referred to or a check is run to see if the selected name switch customer has been suspended from all transactions and if the transactions have been suspended with the order side or hit side customers. Next, at step 4 (ST4), a judgement is made from the results of the check. When it is judged that the transactions have been suspended, the routine returns to step 1, where the selection of a new name switch customer is started. Note that when the customers are grouped together, a check is run to see that there are no transactions made in the same group.

On the other hand, at step 4, when it is judged that transactions have not been suspended, the routine proceeds to step 5 (ST5), where the managed data in the customer ID information file 45 is referred to so as to check if there is a correspondent agreement between the selected name switch customer and the order side customer and if there is a correspondent agreement between the selected name switch customer and hit side customer. Next, at step 6 (ST6), a judgement is made from the results of the check. When it is judged that there is no correspondent agreement, the routine returns to step 1, where the selection of a new name switch customer is started.

On the other hand, when it is judged at the above step 6 that there is a correspondent agreement, the routine proceeds to step 7 (ST7), where a check is run on the credit line. That is, the following are read out from the credit line management file 46: (1) the present value of the credit line set by the order side customer for the name switch customer, (2) the present value of the credit line set by the name switch customer for the order side customer, (3) the present value of the credit line set by the hit side customer for the name switch customer, and (4) the present value of the credit line set by the name switch customer for the hit side customer. The present values of the four credit lines and the maximum deal, defined as the smaller of the amount offered by the order and the amount displayed by the hit request, are compared and a check is run to see if the present values of the credit lines are larger than the maximum deal or not.

Next, at step 8 (ST8), a judgement is made from the results of the check. When it is judged that the present value of the credit line is smaller than the maximum deal, the routine returns to step 1. By this, the selection of a new name switch customer is started.

On the other hand, at the above step 8, when it is judged that the present value of the credit line is not smaller than the maximum deal, the routine proceeds to step 9 (ST9), where it is judged if the name switch customer has been selected by the frequency of selection allowed for that day due to the present selection. Here, the present value and the upper limit of the frequency of selection are for example managed by the name switch customer list file 47. Next, at step 10 (ST10), a judgement is made from the results of the check. When it is judged that the frequency of selection of the name switch customer has exceeded the upper limit, the routine returns to step 1, where the selection of a new name switch customer is started.

On the other hand, at the above step 10 when it is judged that the frequency of selection of a name switch customer has not exceeded an upper limit, it is possible to confirm the interposition of the name switch customer to establish the transaction between the order side customer and the hit side customer, so the routine proceeds to step 11 (ST11), where the above-mentioned maximum deal (the smaller of the amount of the placed order and the amount of the hit request) is determined as the deal amount serving as the amount of the transaction. Next, the present values of the credit lines managed by the credit line management file 46 (present values of four credit lines explained with reference to step 7) are reduced by exactly the amount of the deal in accordance with the thus set deal amount, then the frequency of selection of the name switch customer is incremented by 1 and the processing is ended.

In this way, since a credit line check is performed at step 7, a name switch customer with a credit line not smaller than the maximum deal is selected. For example, if an order side customer offers an amount of 10 and the hit side customer requests an amount of 8, the maximum deal, that is, the amount of 8, is set as the amount of the deal which can be established by intervention of a name switch customer.

Figure 16:
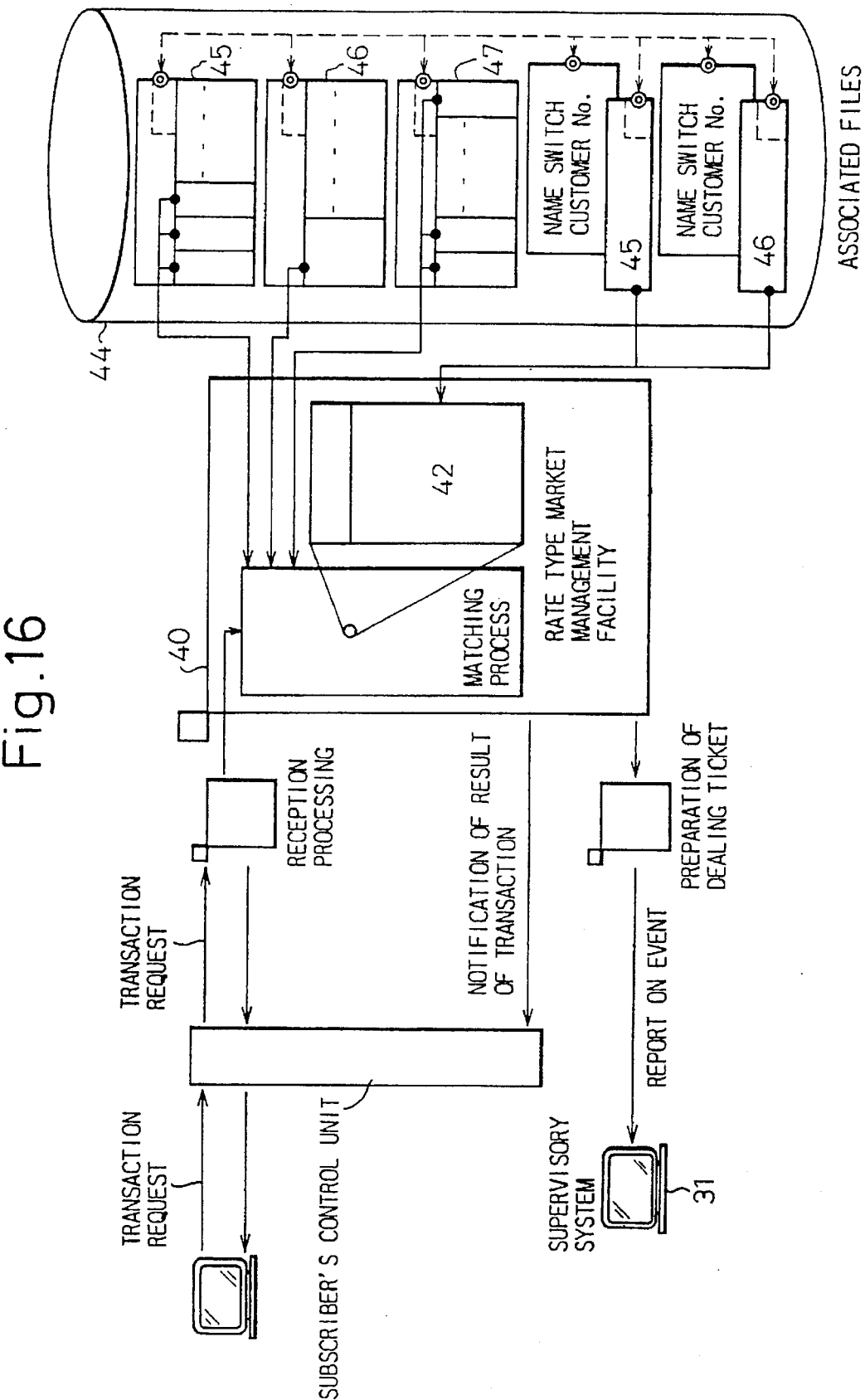
FIG. 16 is a view for explaining the processing in the name switch process.

In this way, the name switch process 42 executes the flow of processing of FIGS. 14A and 14B. When a transaction between an order side customer and a hit side customer fails to be established due to factors other than the transaction price and the transaction amount, the transaction is not immediately considered to have failed. Processing is performed so as to establish the transaction between the order side and the hit side customers through interposition of a name switch customer able to intervene. FIG. 16 illustrates the name switch process 42.

Note that in the flows of processing shown in FIGS. 14A and 14B, it was decided as a condition for selection of a name switch customer that the frequency of selection be less than an upper limit, but the invention is not limited to this. It is also possible to use a limitation based on the accumulative value of the amount of transactions so that the sum of the accumulative value of the deals set with each previous selected and the present maximum deal is less than a certain limit.

Next, a detailed explanation will be made of the processing executed by the inactive order check process 43 in accordance with the flow of processing shown in FIG. 15.

Figure 15:
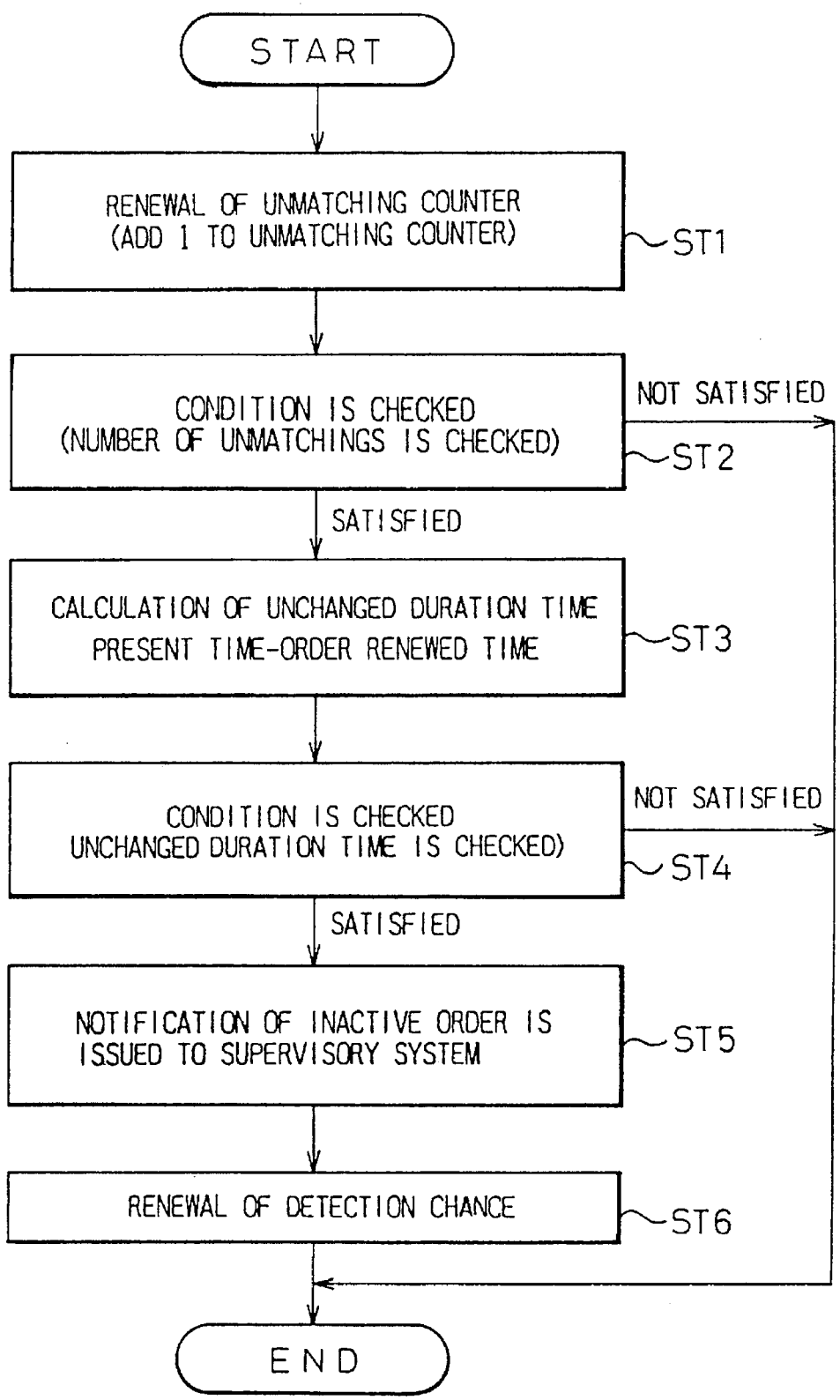
FIG. 15 is a flow chart showing an embodiment of processing executed in an inactive order check process.

When a transaction fails to be established, the inactive order check process 43, as shown in the flow of processing of FIG. 15, increments by 1 at step 1 (ST1) the unmatched frequency of the order for the transaction managed by the order management file 48 (FIG. 7). Next, at step 2 (ST2), the product of the value setting the units of detection of unmatching (for example, 100 times) read out from the system parameter file 49 and the detection chance of the order read out from the order management file 48 (initial value of 1) is calculated and it is judged if the unmatched frequency renewed at step 1 is larger than the product.

At step 2, when it is judged that the renewed unmatched frequency is smaller than the product, the processing is ended as is since it means that the unmatched frequency counted from the previous execution of the processing does not exceed a prescribed frequency. On the other hand, when it is judged that the renewed unmatched frequency is larger than the product, the routine proceeds to step 3 (ST3), where the time of receipt of the order (when renewal has been performed after the receipt, the renewed time is written in, so the time of renewal becomes the time of receipt) is read out from the transaction ID list file 50 and the difference between the present time and the read out time is calculated so as to calculate the duration of the unchanged state of the order.

Next, at step 4 (ST4), the setting value of the maximum unchanged duration is read out from the system parameter file 49 and it is judged if the duration of the unchanged state calculated at the above step 3 is larger than this setting value. At step 4, when it is judged if the calculated duration of the unchanged state is smaller than the setting value, the processing is ended as is since it means that the time elapsed from the previous execution of processing is not over the prescribed time. On the other hand, when it is judged that the calculated duration of the unchanged state is larger than the setting value, the routine proceeds to step 5 (ST5), wherein the monitoring system 31 (FIG. 4) is notified to the effect that the order is an inactive order, then at step 6 (ST6), the detection chance value of the order management file 48 to be given in the next processing is incremented by 1 and the processing ended.

In this way, the inactive order check process 43 executes the processing of FIG. 15 so as to perform processing to notify the monitoring system 31 that even though there is an order for which frequent inquiries on transactions are made due to the order appearing attractive at first glance to the hit side customers, no transaction is established due to reasons such as the low credit of the order side customer and perform processing to eliminate that order from the electronic dealing market. FIG. 17 illustrates the processing of the inactive order check process 43.

Note that in the flow of processing of FIG. 15, the case was disclosed of checking whether an order for a transaction is inactive when a transaction fails to be established, but the invention is not limited to this. It is also possible to periodically monitor the situation without regard to the transactions.

As explained above, in the electronic dealing system according to the present invention, when a transaction between an order side customer and a hit side customer fails to be established due to factors other than the transaction amount, the transaction is not immediately considered to have failed, but is made to be established through the interposition of a name switch customer able to intervene, so the probability of the establishment of a transaction is increased.

Further, even if there is an order for which frequent inquiries on transactions are made due to the order appearing attractive at first glance to the hit side customers, if no transaction is established due to reasons such as the low credit of the order side customer, that order is eliminated from the electronic dealing market. Therefore, the probability of establishment of transactions is raised by leaving just active orders in the electronic market.

We claim:

1. An electronic dealing system which electronically performs matching processing between information on transaction orders placed by order side customers and information on transaction orders placed by hit side customers so as to establish transactions after confirmation of at least one of correspondent agreements and credit lines both defined between the order side and hit side customers, said electronic dealing system comprising:

counting means for counting the frequency of failure of establishment of a transaction for each order placed by said order side customers;

timer means for timing the duration of an unchanged state during which transactions are not established for each order placed by said order side customers; and detecting means for detecting orders for which the count has reached a prescribed frequency of failure of establishment and for which the time has reached a prescribed duration by referring to the count of the counting means and the time of the timer means, the orders, detected by the detecting means, displayed on an external display or forcibly eliminated from the electronic dealing system.

2. An electronic dealing system as set forth in claim 1, wherein said detecting means detects when two states occur, the first in which the count of the counting means has exceeded the prescribed frequency of failure of establishment for an order in transaction when the transaction fails to be established and the second in which the time of the timer means has exceeded a prescribed duration.

3. An electronic dealing system which electronically performs matching processing between information on transaction orders placed by order side customers and information on transaction orders placed by hit side customers so as to establish transactions, said electronic dealing system comprising:

management means for managing the information on transactions of one or more customers set as name switch customers;

counting means for counting the frequency of failure of establishment of a transaction due to factors other than a transaction price and a transaction amount; and specifying means, connected to said counting means and activated thereby when the frequency of failure of establishment reaches a prescribed frequency and further connected to said management means to select information on transactions of name switch customers, for evaluating the selected information on transactions and the information on transactions of the order side customers and the hit side customers, and for specifying a name switch customer interposed between the order side and hit side customers as well as specifying an amount of a transaction to be established therebetween.

4. An electronic dealing system as set forth in claim 3, wherein:

said management means manages as the information on transactions of said name switch customers information on whether transactions have been suspended, information on correspondent agreements, and information on credit lines; and said specifying means, in accordance with the managed data of the management means, specifies a name switch customer which can establish the transaction between the order side and hit side customers, which name switch customer does not suspend a transaction with the order side and the hit side customer, has a correspondent agreement with the order side and hit side customer and satisfies the limiting conditions determined by taking the credit lines into account.

5. An electronic dealing system as set forth in claim 4, wherein, as a limiting condition based on a credit line, said specifying means makes as a condition for specifying a name switch customer that the name switch customer have a credit line able to realize a maximum matching amount of the transaction between the order side customer and hit side customer to be established by the interposition of said name switch customer.

6. An electronic dealing system as set forth in claim 5, wherein:

provision is made of a specified frequency counting means for counting a frequency specified by said specifying means for a prescribed period for each name switch customer; and said specifying means performs processing so as not to specify a name switch customer for which the specified frequency counted by the specified frequency counting means exceeds a prescribed value as a new name switch customer for the remainder of the prescribed period.

7. An electronic dealing system as set forth in claim 6, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

8. An electronic dealing system as set forth in claim 5, wherein:

provision is made of a specified transaction amount accumulating means for accumulating transaction amounts specified by said specifying means during a prescribed period for each name switch customer; and said specifying means performs processing so as not to specify a name switch customer for which the amount of transactions, accumulated by the specified transaction amount accumulating means, no longer satisfies prescribed conditions as a new name switch customer for the remainder of the prescribed period.

9. An electronic dealing system as set forth in claim 8, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

10. An electronic dealing system as set forth in claim 5, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

11. An electronic dealing system as set forth in claim 4, wherein:

provision is made of a specified frequency counting means for counting a frequency specified by said specifying means for a prescribed period for each name switch customer; and said specifying means performs processing so as not to specify a name switch customer for which the specified frequency counted by the specified frequency count means exceeds a prescribed value as a new name switch customer for the remainder of the prescribed period.

12. An electronic dealing system as set forth in claim 11, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

13. An electronic dealing system as set forth in claim 4, wherein:

provision is made of a specified transaction amount accumulating means for accumulating transaction amounts specified by said specifying means during a prescribed period for each name switch customer; and said specifying means performs processing so as not to specify a name switch customer for which the amount of transactions, accumulated by the specified transaction amount accumulating means, no longer satisfies prescribed conditions as a new name switch customer for the remainder of the prescribed period.

14. An electronic dealing system as set forth in claim 13, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

15. An electronic dealing system as set forth in claim 4, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using the agreement.

16. An electronic dealing system as set forth in claim 3, wherein:

provision is made of a specified frequency counting means for counting a frequency specified by said specifying means for a prescribed period for each name switch customer; and said specifying means performs processing so as not to specify a name switch customer for which the specified frequency counted by the specified frequency counting means exceeds a prescribed value as a new name switch customer for the remainder of the prescribed period.

17. An electronic dealing system as set forth in claim 16, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using an agreement.

18. An electronic dealing system as set forth in claim 3, wherein:

provision is made of a specified transaction amount accumulating means for accumulating transaction amounts specified by said specifying means during a prescribed period for each name switch customer; and said specifying means performs processing so as not to specify a name switch customer for which the amount of transactions, accumulated by the specified transaction amount accumulating means, no longer satisfies prescribed conditions as a new name switch customer for the remainder of the prescribed period.

19. An electronic dealing system as set forth in claim 18, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using an agreement.

20. An electronic dealing system as set forth in claim 3, wherein:

said counting means performs processing so that the counting processing is not executed, even when a transaction cannot be established due to factors other than a transaction price and transaction amount, if one of the order side customer or hit side customer engaged in the transaction is a customer using an agreement; and said specifying means performs processing so as not to activate its specification operation, even when a transaction is not established due to factors other than a transaction price and transaction amount, if one of the order side customer or hit side customer in the transaction is a customer using an agreement.

* * * * *

UNITED STATES PATENT AND TRADEMARK OFFICE
CERTIFICATE OF CORRECTION

PATENT NO. : 5,655,088
DATED : August 5, 1997
INVENTOR(S) : Hideyo MIDORIKAWA et al.

It is certified that error appears in the above-identified patent and that said Letters Patent is hereby corrected as shown below:

On the title page, under U.S. Patent Documents, the second column, line 1, change "Wagner" to --Benton et al.--;

* On the title page, in the Abstract, line 1, change "proves" to --provides--;
* line 5, change "transactions the" to --transactions. The--.

Signed and Sealed this

Twenty-seventh Day of January, 1998

Attest:

BRUCE LEHMAN

*Attesting Officer*   *Commissioner of Patents and Trademarks*